United States Patent
Han

(10) Patent No.: US 10,811,730 B2
(45) Date of Patent: Oct. 20, 2020

(54) POUCH EXTERIOR FOR SECONDARY BATTERY AND POUCH-TYPE SECONDARY BATTERY COMPRISING SAME

(71) Applicant: LG Chem, Ltd., Seoul (KR)

(72) Inventor: Jae-Beom Han, Daejeon (KR)

(73) Assignee: LG Chem, Ltd. (KR)

( * ) Notice: Subject to any disclaimer, the term of this patent is extended or adjusted under 35 U.S.C. 154(b) by 0 days.

(21) Appl. No.: 15/554,874

(22) PCT Filed: Mar. 25, 2016

(86) PCT No.: PCT/KR2016/003091
§ 371 (c)(1),
(2) Date: Aug. 31, 2017

(87) PCT Pub. No.: WO2016/159596
PCT Pub. Date: Oct. 6, 2016

(65) Prior Publication Data
US 2018/0040913 A1   Feb. 8, 2018

(30) Foreign Application Priority Data

Mar. 27, 2015 (KR) .................. 10-2015-0043425

(51) Int. Cl.
*H01M 10/058* (2010.01)
*H01M 2/02* (2006.01)
(Continued)

(52) U.S. Cl.
CPC ........... *H01M 10/058* (2013.01); *B32B 15/08* (2013.01); *H01M 2/02* (2013.01); *H01M 2/021* (2013.01);
(Continued)

(58) Field of Classification Search
CPC ....... B32B 15/08; H01M 10/058; H01M 2/02; H01M 2/021; H01M 2/0212;
(Continued)

(56) References Cited

U.S. PATENT DOCUMENTS 5,223,174 A      6/1993  Chou et al.
2002/0147275 A1* 10/2002 Bublewitz ................ A61K 6/90
                                                          525/100

(Continued)

FOREIGN PATENT DOCUMENTS

EP    3171424 A1    5/2017
JP    H06509832 A   11/1994
(Continued)

OTHER PUBLICATIONS

Kim et al., The Pouch Type Secondary Battery in Which the Electrically Insulating and Moisture Osmosis Are Improved, Jun. 13, 2013, Korean Patent Information Online Network (Year: 2013).*
(Continued)

*Primary Examiner* — Adam A Arciero
(74) *Attorney, Agent, or Firm* — Lerner, David, Littenberg, Krumholz & Mentlik, LLP

(57) ABSTRACT

The present invention relates to a pouch exterior which can effectively block moisture penetration, and a pouch-type secondary battery comprising the same. In particular, according to the present invention, it is possible to effectively block moisture penetration between bonding interfaces at a sealing part of an upper pouch and a lower pouch. Therefore, according to the present invention it is possible to prevent the deterioration and degradation of performance of a secondary battery due to moisture penetration, and to increase stability of a secondary battery.

4 Claims, 9 Drawing Sheets

(51) Int. Cl.
*B32B 15/08* (2006.01)
*H01M 2/08* (2006.01)

(52) U.S. Cl.
CPC ....... *H01M 2/0212* (2013.01); *H01M 2/0275* (2013.01); *H01M 2/0277* (2013.01); *H01M 2/0285* (2013.01); *H01M 2/0287* (2013.01); *H01M 2/08* (2013.01)

(58) Field of Classification Search
CPC ............ H01M 2/0275; H01M 2/0277; H01M 2/0285; H01M 2/0287; H01M 2/08
See application file for complete search history.

(56) References Cited

U.S. PATENT DOCUMENTS

| 2002/0164441 | A1 | 11/2002 | Amine et al. | |
| 2007/0207379 | A1* | 9/2007 | Hatta | H01M 2/0207 429/176 |
| 2008/0268261 | A1* | 10/2008 | Schwoeppe | C09K 3/1021 428/432 |
| 2014/0377636 | A1 | 12/2014 | Sung et al. | |

FOREIGN PATENT DOCUMENTS

| JP | 2000173558 A | 6/2000 |
| JP | 2004296174 A | 10/2004 |
| JP | 2007265989 A | 10/2007 |
| JP | 200841494 A | 2/2008 |
| JP | 200973010 A | 4/2009 |
| JP | 2012140636 A | 7/2012 |
| KR | 100197309 B1 | 6/1999 |
| KR | 20130070624 A | 6/2013 |
| KR | 20130081445 A | 7/2013 |
| KR | 20140061146 A | 5/2014 |
| WO | 9304136 A1 | 3/1993 |

OTHER PUBLICATIONS

Search report from International Application No. PCT/KR2016/003091, dated Aug. 2, 2016.
Extended European Search Report for Application No. EP16773377.3 dated May 30, 2018.

* cited by examiner

POUCH EXTERIOR FOR SECONDARY BATTERY AND POUCH-TYPE SECONDARY BATTERY COMPRISING SAME

CROSS-REFERENCE TO RELATED APPLICATION

This application is a national phase entry under 35 U.S.C. § 371 of International Application No. PCT/KR2016/003091, filed Mar. 25, 2016, which claims priority to Korean Patent Application No. 10-2015-0043425, filed Mar. 27, 2015, the disclosures of which are incorporated herein by reference.

TECHNICAL FIELD

The present disclosure relates to fabrication of secondary batteries, and more particularly, to a pouch packaging for effectively preventing moisture permeation and a pouch-type secondary battery including the same.

BACKGROUND ART

Recently, with the fast growing demand for portable electronic products such as laptop computers, video cameras and mobile phones and the extensive development of electric vehicles, accumulators for storing energy, robots and satellites, high performance secondary batteries that are rechargeable repeatedly are being actively studied.

Currently commercially available secondary batteries include nickel cadmium batteries, nickel hydrogen batteries, nickel zinc batteries, and lithium secondary batteries, and among them, lithium secondary batteries are gaining more attention than nickel-based secondary batteries because of their advantages; lithium secondary batteries have little or no memory effects so that they can be freely charge and discharge, and have a very low self-discharge rate and high energy density. Generally, lithium secondary batteries can be classified into can-type secondary batteries and pouch-type secondary batteries according to the packaging or the type of application.

FIG. 1 is an exploded perspective view showing the components of a traditional pouch-type secondary battery, and FIG. 2 is an assembled view of the pouch-type secondary battery of FIG. 1. As shown in FIG. 1, the pouch-type secondary battery generally includes an electrode assembly 20 having a positive electrode tab 21 and a negative electrode tab 22, and a pouch packaging 10 in which the electrode assembly 20 is received.

Referring to FIGS. 1 and 2, the pouch packaging 10 is composed of an upper pouch 11 and a lower pouch 12, and the electrode assembly 20 and an electrolyte solution are received in an internal space formed by the upper pouch 11 and the lower pouch 12. Furthermore, a sealing part is formed on each outer peripheral surface of the upper pouch 11 and the lower pouch 12 to seal the internal space, and the sealing parts are adhered (sealed) to each other.

The pouch packaging 10 is configured such that a thin film of metal such as aluminum is included to protect the internal components such as the electrode assembly 20 and the electrolyte solution, enhance the chemical properties of the electrode assembly 20 and the electrolyte solution, and improve heat resistance. Furthermore, the metal thin film is interposed between insulating layers formed of an insulating material to ensure electrical insulation from the components inside of the secondary battery such as the electrode assembly 20 and the electrolyte solution or other components outside of the secondary battery.

FIG. 3 is a cross-sectional view taken along the line of A-A' in FIG. 2, and FIG. 4 is a partial enlarged view of section B in FIG. 3.

Referring to FIGS. 3 and 4, each of the upper pouch 11 and the lower pouch 12 includes an outer insulating layer 11a, 12a, a metal layer 11b, 12b, and an inner insulating layer 11c, 12c. Furthermore, to seal the internal space of the upper pouch 11 and the lower pouch 12, the sealing part of the upper pouch 11 and the sealing part of the lower pouch 12 are adhered by heat fusion. Because the upper pouch 11 and the lower pouch 12 are adhered together at the sealing parts, the inner insulating layer 11c of the upper pouch and the inner insulating layer 12c of the lower pouch are generally formed of a material that achieves good adhesion by heat fusion, such as polypropylene (PP).

However, it is not easy to ensure perfect sealability of the secondary battery, though the upper pouch 11 and the lower pouch 12 are adhered together at the sealing parts. Particularly, adhesive polymer such as polypropylene is vulnerable to moisture permeation, so the traditional pouch-type secondary battery may suffer from moisture permeation between the inner insulating layer 11c of the upper pouch and the inner insulating layer 12c of the lower pouch.

When moisture permeates into secondary batteries, not only the secondary batteries are damaged, but also safety of the secondary batteries reduces. Moreover, lithium ion secondary batteries use an electrolyte solution in which an electrolyte and additive are dissolved in a non-aqueous solvent such as carbonate ester, and in many cases, for electrolytes, fluoride-based electrolytes having good properties in terms of conductivity, potential window, and interaction with metal are used. However, fluoride liberates hydrogen fluoride by hydrolysis, and the produced hydrogen fluoride may cause dissolution of electrode materials or corrosion of current collectors, resulting in battery performance degradation. Furthermore, moisture causes side reactions, accelerating battery degradation and shortening the life, and generates gas, causing explosions.

Further, recently, a medium-large battery pack is often constructed by electrically connecting many secondary batteries, and in this case, performance degradation occurring in some secondary batteries will result in performance degradation in the entire medium-large battery pack.

DISCLOSURE

Technical Problem

Therefore, the present disclosure is designed to solve the problems such as those above, and the present disclosure is directed to providing a pouch packaging for effectively preventing moisture from permeating into the interface at which sealing parts of the pouch packaging are adhered, and a pouch-type secondary battery including the same. These and other objects and advantages of the present disclosure can be understood by the following detailed description and will be apparent from the embodiments of the present disclosure. Furthermore, it will be easily understood that the objects and advantages of the present disclosure may be achieved by the means set forth in the appended claims and combinations thereof.

Technical Solution

The present disclosure provides a pouch packaging of a secondary battery to achieve the object. The pouch packaging according to the present disclosure includes an upper pouch and a lower pouch, and the upper pouch and the lower pouch are each formed by laminating an outer insulating layer, a metal layer, and an inner insulating layer in a sequential order and the upper pouch and the lower pouch have a sealing part formed along each outer peripheral surface, and the inner insulating layer may include a moisture adsorbent material.

In the present disclosure, the moisture adsorbent material may include at least one selected from the group consisting of an oxazolidine-based compound, calcium chloride, alumina, and zeolite, and preferably, may contain oxazolidine.

In the present disclosure, the oxazolidine-based compound is represented by the following formula 1 or 2:

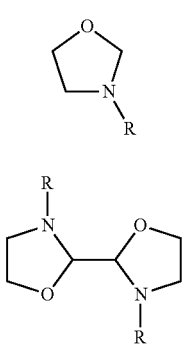

[Formula 1]

[Formula 2]

where R may be one of hydrogen (—H), a straight or branched alkyl group having 1 to 10 carbon atoms, and an aryl group, and hydrogen bonded to each carbon atom in the compounds of formulas 1 and 2 may be each independently substituted by one of a straight or branched alkyl group having 1 to 10 carbon atoms and an aryl group.

In the present disclosure, the moisture adsorbent material may be present in an amount of 0.01 to 10 parts by weight per 100 parts by weight of the inner insulating layer.

Furthermore, the present disclosure provides a pouch-type secondary battery, and the secondary battery includes an electrode assembly including a positive electrode plate, a negative electrode plate, and a separator interposed between, and a pouch packaging in which the electrode assembly and an electrolyte solution are received, the pouch packaging including an upper pouch and a lower pouch, and the pouch packaging has the aforementioned features.

Furthermore, the pouch-type secondary battery may have a sealing part coated with a finishing tape in whole or at least in part to prevent a cut surface of the sealing part from being exposed to outside.

Here, the finishing tape may have an adhesive layer on one surface, and the adhesive layer may include a moisture adsorbent material.

In the present disclosure, the moisture adsorbent material may include at least one selected from the group consisting of an oxazolidine-based compound, calcium chloride, alumina, and zeolite. Preferably, the moisture adsorbent material may include an oxazolidine-based compound.

In the present disclosure, the oxazolidine-based compound may be represented by the following formula 1 or 2:

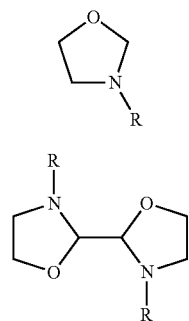

[Formula 1]

[Formula 2]

where R may be one of hydrogen (—H), a straight or branched alkyl group having 1 to 10 carbon atoms, and an aryl group, and hydrogen bonded to each carbon atom in the compounds of formulas 1 and 2 may be each independently substituted by one of a straight or branched alkyl group having 1 to 10 carbon atoms and an aryl group.

Advantageous Effects

According to the present disclosure, there is provided a pouch packaging for effective preventing external moisture from permeating into the inside and a pouch-type secondary battery including the same. Particularly, the present disclosure can effectively prevent moisture permeation through an adhesion interface between sealing parts of an upper pouch and a lower pouch. Accordingly, the present disclosure can prevent the occurrence of performance degradation and deterioration phenomena of the secondary battery caused by moisture permeation, and improve safety of the secondary battery.

Furthermore, the present disclosure performs a finishing process by taping the adhesion sections of the pouch sealing parts with a polymer finishing tape including a moisture adsorber to not only effectively prevent moisture permeation through between the cut surfaces of the sealing parts, but also prevent a metal layer of the upper pouch or the lower pouch from being exposed to the outside. Accordingly, the present disclosure can prevent the insulation destruction of the secondary battery caused by the exposure of the metal layer.

BRIEF DESCRIPTION OF DRAWINGS

The accompanying drawings illustrate preferred embodiments of the present disclosure, and together with the foregoing disclosure, serve to provide further understanding of the technical aspects of the present disclosure. However, the present disclosure is not to be construed as being limited to the drawings.

MODE FOR CARRYING OUT THE INVENTION

Figure 1:
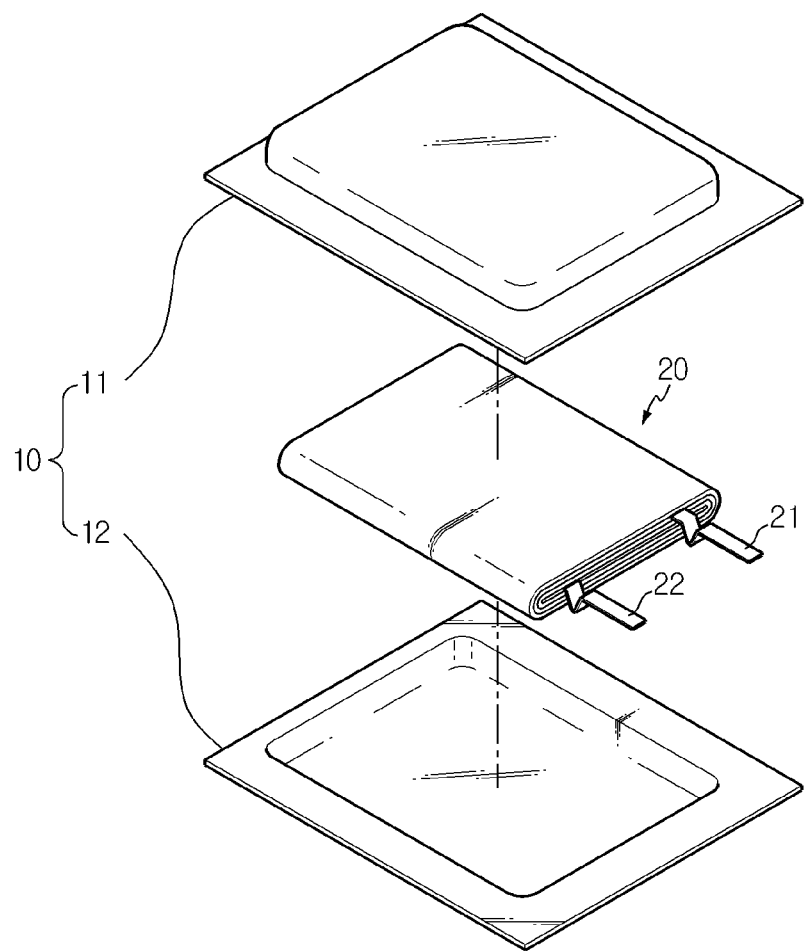
FIG. 1 is an exploded perspective view showing the components of a traditional pouch-type secondary battery.
Figure 2:
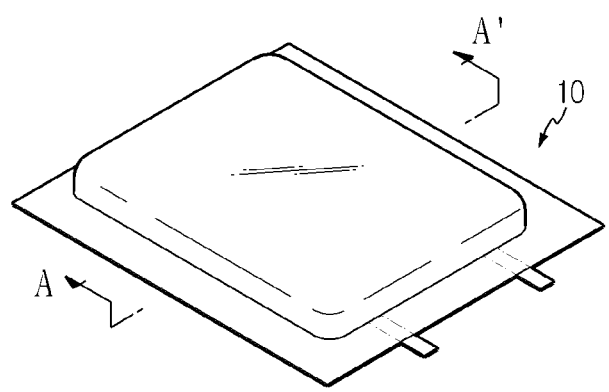
FIG. 2 is an assembled view of the pouch-type secondary battery of FIG. 1.
Figure 3:
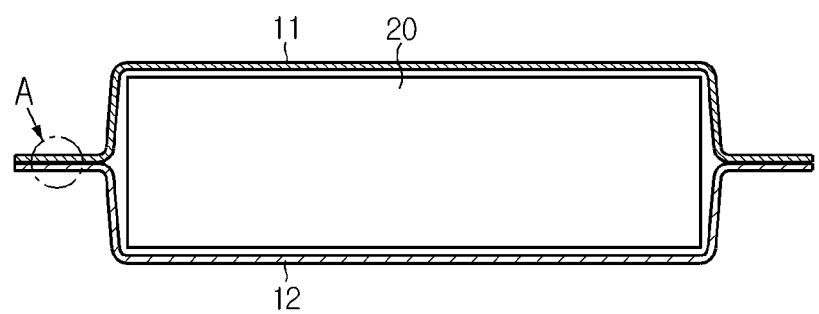
FIG. 3 is a cross-sectional view taken along the line of A-A' in FIG. 2.
Figure 4:
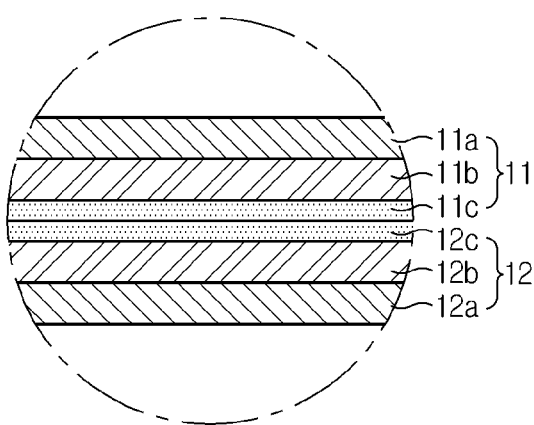
FIG. 4 is a partial enlarged view of section B in FIG. 3.

Hereinafter, the present disclosure will be described in detail.

It should be understood that the terms or words used in the specification and the appended claims should not be construed as limited to general and dictionary meanings, but interpreted based on the meanings and concepts corresponding to the technical aspects of the present disclosure on the basis of the principle that the inventor is allowed to define terms appropriately for the best explanation. Accordingly, the embodiments stated herein and illustrations in the drawings are just the most preferred embodiment of the present disclosure, and do not represent all the technical aspects of the present disclosure, so it should be understood that many equivalents and modifications could be made as alternatives thereto at the time the application is filed.

The present disclosure relates to a pouch packaging including a moisture adsorbent material and a pouch-type secondary battery including the same. The moisture adsorbent material may be included in the pouch packaging, especially, an inner insulating layer. Furthermore, according to a further embodiment of the present disclosure, the pouch-type secondary battery of the present disclosure is characterized in that a cut surface of the pouch packaging is finished with a finishing tape, and the moisture adsorbent material may be further included in the finishing tape.

Figure 5:
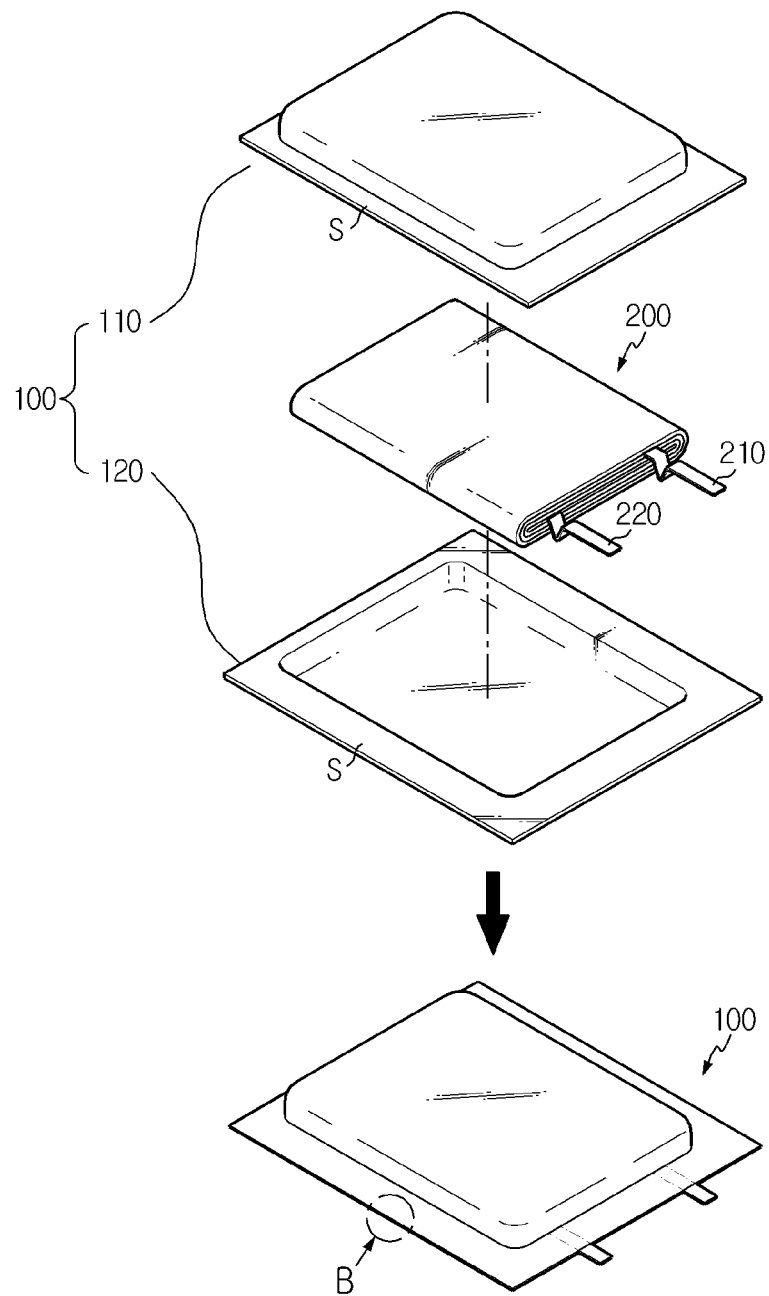
FIG. 5 is an exploded perspective view showing the components of a pouch-type secondary battery according to a preferred embodiment of the present disclosure.
Figure 6:
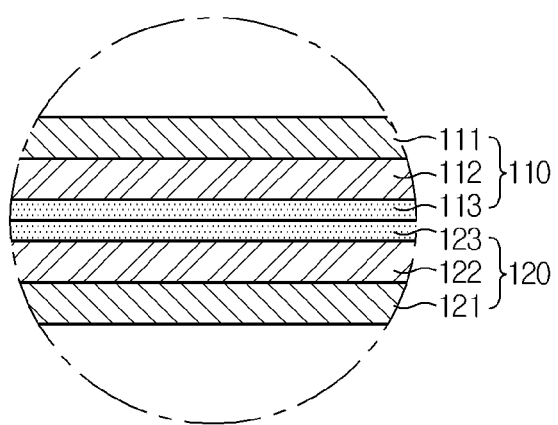
FIG. 6 is an enlarged view of section A in FIG. 5.

FIG. 5 shows a cross section of a sealing part of a pouch-type secondary battery according to a preferred embodiment of the present disclosure. Referring to FIG. 5, the pouch-type secondary battery according to the present disclosure includes an electrode assembly 200 and a pouch packaging 100.

The electrode assembly 200 is constructed such that a positive electrode (cathode) plate and a negative electrode (anode) plate are placed with a separator interposed between. The positive electrode and the cathode are interchangeably used as synonyms in the specification. Furthermore, the negative electrode and the anode are interchangeably used as synonyms in the specification. In this instance, the electrode assembly 200 may have a structure in which a positive electrode plate and a negative electrode plate are wound with a separator interposed between, or a structure in which a plurality of positive electrode plates and a plurality of negative electrode plates are stacked with separators interposed between. Each of the positive electrode plate and the negative electrode plate may be formed by applying an active material slurry to an electrode current collector, and the slurry may be generally prepared by stirring a particulate active material, an auxiliary conductor, a binder, and a plasticizer with an addition of a solvent.

On the other hand, the electrode assembly 200 may have an uncoated part where the slurry is not applied to the electrode plate, and electrode tabs corresponding to each electrode plate may be provided in the uncoated part. That is, a positive electrode tab 210 may be attached to the positive electrode plate of the electrode assembly 200, and a negative electrode tab 220 may be attached to the negative electrode plate of the electrode assembly 200. The positive electrode tab 210 and the negative electrode tab 220 come out of the pouch packaging 100 as shown in FIG. 5 to form a positive electrode terminal and a negative electrode terminal. Rather, the positive electrode tab 210 and the negative electrode tab 220 are not directly exposed to the outside through the pouch packaging 100, and instead, the positive electrode tab 210 and the negative electrode tab 220 are connected to other components such as a positive electrode lead and a negative electrode lead, and the positive electrode lead and the negative electrode lead may be exposed to the outside through the pouch packaging 100.

The pouch packaging 100 includes an upper pouch 110 and a lower pouch 120. The upper pouch 110 and the lower pouch 120 have an internal space of a dented shape, and the electrode assembly 200 and an electrolyte solution are received in the internal space.

Furthermore, the pouch packaging 100 may maintain its sealed condition by sealing parts S adhered together. That is, each of the upper pouch 110 and the lower pouch 120 has the sealing part S along the edges, and after the electrode assembly 200 and an electrolyte are received in a receiving space formed at the inside of the edges, the sealing parts S are adhered (sealed) together. In this instance, the sealing parts S of the upper pouch 110 and the lower pouch 120 may be adhered, for example, by a heat fusion process.

On the other hand, each of the upper pouch 110 and the lower pouch 120 includes an outer insulating layer 111, 121, a metal layer 112, 122 and an inner insulating layer 113, 123, and is formed by laminating the outer insulating layer, the metal layer and the inner insulating layer in a sequential order.

Here, the outer insulating layer 111, 121 may be formed of an insulating material such as polyethylene terephthalate (PET) resin or nylon resin to ensure insulation of the secondary battery from the outside.

The metal layer 112, 122 includes, but is not limited to, metal selected from the group consisting of copper (Cu), aluminum (Al), nickel (Ni), iron (Fe), carbon (C), chrome (Cr), manganese (Mn) and alloys thereof. For the metal layer, aluminum is preferable from the exemplary metals.

In a specific embodiment of the present disclosure, the inner insulating layer 113, 123 may include at least one polyolefin resin of poly ethylene (PE) resin, poly propylene (PP) resin, their random copolymer, and triblock copolymer of propylene, butylene and ethylene for adhesion between the upper pouch 110 and the lower pouch 120 when sealing the pouches. Preferably, the inner insulating layer includes at least one polypropylene-based resin of polypropylene-based homopolymer, polypropylene-based copolymer and casted polypropylene (cPP). However, the inner insulating layer is not particularly limited thereto.

Furthermore, according to a specific embodiment of the present disclosure, the inner insulating layer 113, 123 includes a moisture adsorbent material. Here, the moisture adsorbent material may include at least one of oxazolidine-based compounds, calcium chloride, alumina and zeolite. Preferably, the inner insulating layer 113, 123 includes an oxazolidine-based compound as the moisture adsorbent material. Furthermore, according to a specific embodiment of the present disclosure, in addition to the oxazolidine-based compound, the inner insulating layer 113, 123 may further include at least one auxiliary moisture adsorbent material of calcium chloride, alumina and zeolite as the moisture adsorbent material. Rather, the auxiliary moisture adsorbent material is not limited to the exemplary materials, and any material having a function to adsorb moisture may be employed as the claimed auxiliary moisture adsorbent material.

According to a specific embodiment of the present disclosure, the inner insulating layer 113, 123 may be formed such that the moisture adsorbent material is dispersed in polymer resin such as polypropylene-based resin that forms the inner insulating layer. Furthermore, in the present disclosure, the moisture adsorbent material and/or the auxiliary moisture adsorbent material is present in an amount of from 0.01 parts by weight to 10 parts by weight, or from 0.01 parts by weight to 5 parts by weight, per 100 parts by weight of the inner insulating layer. Furthermore, in a specific embodiment of the present disclosure, the content of the oxazolidine-based compound in the inner insulating layer is 1000 ppm or more, preferably 2000 ppm or more.

According to a specific embodiment of the present disclosure, the oxazolidine-based compound includes at least one of compounds represented by one of the following formulas 1 and 2.

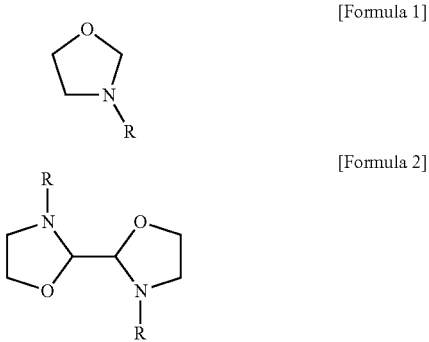

[Formula 1]

[Formula 2]

In the formulas 1 and 2, R may be one of hydrogen (—H), a straight or branched alkyl group having 1 to 10 carbon atoms, and an aryl group, and hydrogen bonded to each carbon atom in the compounds of formulas 1 and 2 may be each independently substituted by one of a straight or branched alkyl group having 1 to 10 carbon atoms and an aryl group.

General moisture adsorbent materials commonly used in the art such as calcium chloride, alumina and zeolite do not remove moisture, i.e., water molecules, and absorb and store water molecules. Accordingly, if moisture adsorbers lose their function, moisture exiting therein may take effect again. In contrast, in the case of oxazolidine-based compounds, because water molecules themselves are removed, the influence by moisture can be reduced in comparison with moisture adsorbent materials which absorb water molecules.

The moisture adsorption mechanism of oxazolidine can be explained as follows:

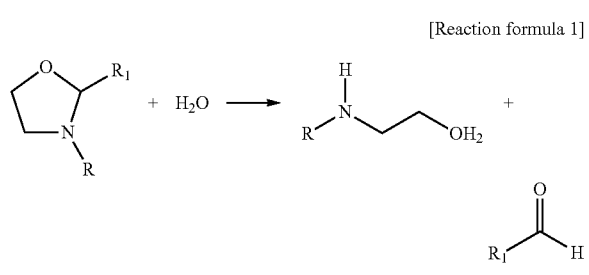

[Reaction formula 1]

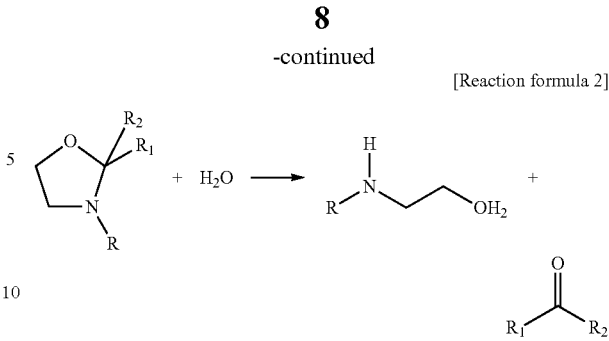

[Reaction formula 2]

According to the reaction formula 1, oxazolidine reacts with water molecules to produce alcohol and aldehyde, and as shown in the reaction formula 2, in the case that two substituents, not hydrogen, are bonded to the second carbon position, instead of aldehyde, ketone is produced. As an effect on the decomposition of water molecules is produced by oxazolidine, the pouch packaging according to the present disclosure has a superior effect in removing moisture.

Furthermore, according to another embodiment of the present disclosure, the pouch-type secondary battery of the present disclosure may further include a finishing tape 300 with which the sealing part cut surface of the pouch is finished to prevent the sealing part cut surface from being exposed to the outside.

Figure 7:
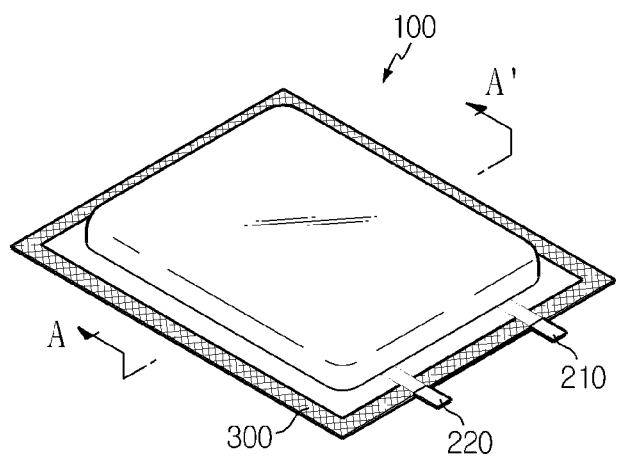
FIG. 7 shows a pouch-type secondary battery according to a specific embodiment of the present disclosure.
Figure 8:
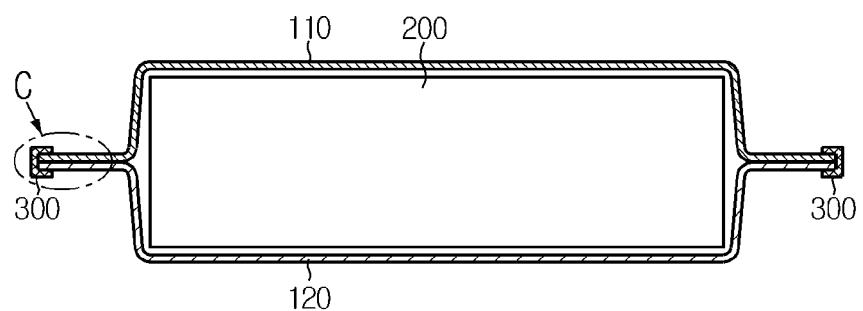
FIG. 8 is a cross-sectional view taken along the line A-A' in FIG. 7.
Figure 9:
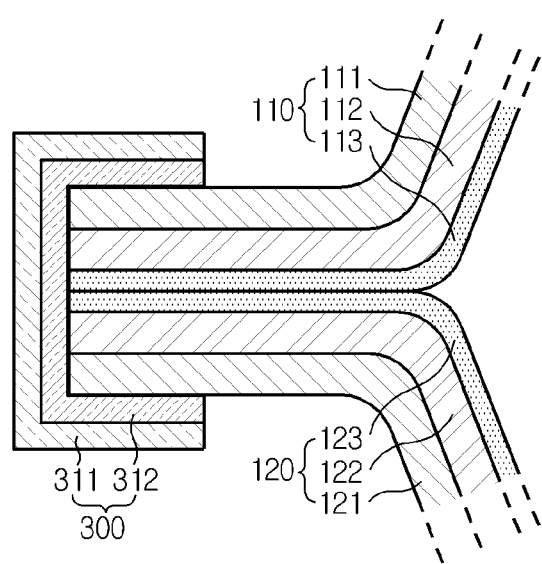
FIG. 9 is an enlarged view of section C in FIG. 8.

FIG. 7 is a schematic perspective view showing the components of the pouch-type secondary battery in which the sealing part cut surface is finished with the finishing tape 300 according to another embodiment of the present disclosure, and FIG. 8 is a cross-sectional view taken along the line of A-A' in FIG. 7.

Referring to FIGS. 7 and 8, the finishing process of the sealing part cut surface is preferably performed on the entire sealing part formed along the outer periphery of the secondary battery using the finishing tape 300 having a predetermined width. In this instance, optionally, an electrode tab drawing portion in the sealing part may not be taped. That is, in the present disclosure, the finishing process of the sealing part cut surface is performed on all except an electrode tab drawing portion using the finishing tape 300 having a predetermined width.

According to a specific embodiment of the present disclosure, the finishing process may be performed by taping to seal the sealing part cut surface in the manner of adhering one end of the finishing tape to the outer insulating layer of the lower pouch, bending the tape along the cut surface of the sealing part, and adhering the other end to the outer insulating layer of the upper pouch, but the finishing process is not limited to this method and may use, without limitations, any method that prevents the sealing part cut from being exposed to the outside.

In a specific embodiment of the present disclosure, the width of the finishing tape is not particularly limited, but preferably the finishing tape is wide enough to coat the full width of the sealing part or at least a half or more of the width of the sealing part.

The finishing tape 300 has an adhesive layer 312 on one surface, and the adhesive layer 312 is adhered to the outer insulating layers 111, 121 of the upper and lower pouches 110, 120. The material 311 of the finishing tape is not limited to a particular type so long as it has an insulating property and is non-reactive to the electrolyte solution. Non-limiting examples of the finishing tape material 311 satisfying the properties include polyethylene, polypropylene, polyester, nylon, vinyl chloride, Teflon (registered trademark), polyimide, Kapton (registered trademark), and polyphenylene-sulfide.

The adhesive layer 312 has adhesive properties, and may include at least one polyolefin resin of poly ethylene (PE) resin, poly propylene (PP) resin, their random copolymer, and triblock copolymer of propylene, butylene and ethylene. Preferably, the adhesive layer 312 includes at least one polypropylene-based resin of polypropylene-based homopolymer, polypropylene-based copolymer, and casted polypropylene (cPP). However, the adhesive layer 312 is not particularly limited thereto, and may include any type capable of forming adhesion with the outer insulating layers 111, 121 of the upper and lower pouches 110, 120.

In a specific embodiment of the present disclosure, the adhesive layer 312 may further include a moisture adsorbent material. The moisture adsorbent material may include at least one of oxazolidine-based compound, calcium chloride, alumina and zeolite. Preferably, the moisture adsorbent material is an oxazolidine-based compound. Furthermore, according to a specific embodiment of the present disclosure, in addition to the oxazolidine-based compound as the moisture adsorbent material, at least one auxiliary moisture adsorbent material of calcium chloride, alumina and zeolite may be further included. Rather, the auxiliary moisture adsorbent material is not limited to the exemplary materials, and any material having a function to adsorb moisture may be employed as the claimed auxiliary moisture adsorbent material.

According to a specific embodiment of the present disclosure, the adhesive layer 312 may be formed such that the moisture adsorbent material is dispersed in polymer resin such as polypropylene-based resin that forms the adhesive layer 312. Furthermore, in the present disclosure, the moisture adsorbent material and/or the auxiliary moisture adsorbent material is present in an amount of from 0.1 parts by weight to 10 parts by weight per 100 parts by weight of the adhesive layer 312.

The description of the oxazolidine-based compound included in the adhesive layer 312 is the same as the description of the oxazolidine-based compound included in the inner insulating layer 113, 123, and a reference is made to the above. Overlapping description is omitted herein.

Furthermore, the present disclosure provides a battery pack including at least two pouch-type secondary batteries. The battery pack includes the pouch-type secondary battery. That is, the battery pack according to the present disclosure includes one or more pouch-type secondary batteries having an inner insulating layer including a moisture adsorbent material.

Furthermore, in addition to the secondary batteries, the battery pack according to the present disclosure may further include many protection devices for controlling the charge and discharge of the secondary batteries such as battery management system (BMS).

While the present disclosure has been hereinabove described with respect to a limited number of embodiments and drawings, the present disclosure is not limited thereto and various modifications and changes could be made by those skilled in the art within the technical aspects of the present disclosure and the scope of equivalents to which the appended claims are entitled.

What is claimed is:

1. A pouch secondary battery, comprising:
    an electrode assembly including a positive electrode plate, a negative electrode plate, and a separator interposed therebetween; and
    a pouch packaging in which the electrode assembly and an electrolyte solution are received, the pouch packaging comprising an upper pouch and a lower pouch, the upper pouch and the lower pouch each formed by laminating an outer insulating layer, a metal layer, and an inner insulating layer in a sequential order, and the upper pouch and the lower pouch having a sealing part formed along each outer peripheral surface,
    wherein the inner insulating layer includes a first moisture adsorbent material,
    wherein the sealing part is coated with a finishing tape in whole or at least in part to prevent a cut surface of the sealing part from being exposed to outside,
    wherein the finishing tape has an adhesive layer on one surface, and the adhesive layer includes a second moisture adsorbent material, and
    wherein each of the first and second moisture adsorbent materials includes an oxazolidine-based compound represented by the following formula:

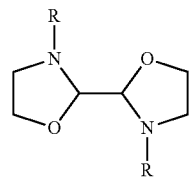

where R may be one of hydrogen (—H), a straight or branched alkyl group having 1 to 10 carbon atoms, and an aryl group, and hydrogen bonded to each carbon atom in the compounds of formulas 1 and 2 may be each independently substituted by one of a straight or branched alkyl group having 1 to 10 carbon atoms and an aryl group.

2. The pouch secondary battery according to claim 1, wherein the first moisture adsorbent material is present in an amount of 0.01 to 10 parts by weight per 100 parts by weight of the inner insulating layer.

3. The pouch secondary battery according to claim 1, wherein the content of the oxazolidine-based compound in the inner insulating layer is 1000 ppm or more.

4. The pouch secondary battery according to claim 1, wherein each of the first and second moisture adsorbent materials consists of the oxazolidine-based compound.

* * * * *